(12) United States Patent
Wiest

(10) Patent No.: US 11,298,782 B2
(45) Date of Patent: Apr. 12, 2022

(54) WELDING JIG ASSEMBLY

(71) Applicant: Justin George Oswald Wiest, Veteran (CA)

(72) Inventor: Justin George Oswald Wiest, Veteran (CA)

(*) Notice: Subject to any disclaimer, the term of this patent is extended or adjusted under 35 U.S.C. 154(b) by 480 days.

(21) Appl. No.: 16/508,190

(22) Filed: Jul. 10, 2019

(65) Prior Publication Data
US 2021/0008672 A1    Jan. 14, 2021

(51) Int. Cl.
*B25B 1/24* (2006.01)
*B23K 37/053* (2006.01)
*B23K 101/06* (2006.01)

(52) U.S. Cl.
CPC ...... *B23K 37/0533* (2013.01); *B23K 2101/06* (2018.08)

(58) Field of Classification Search
CPC .................. B23K 37/0533; B23K 2101/06
USPC .................. 269/309, 296, 279, 902
See application file for complete search history.

(56) References Cited

U.S. PATENT DOCUMENTS

| 5,312,096 A | * | 5/1994 | Jasper | B23K 37/0443 |
| | | | | 269/43 |
| 2007/0241250 A1 | * | 10/2007 | Wong | B23K 37/0435 |
| | | | | 248/226.11 |
| 2015/0060528 A1 | * | 3/2015 | Reid | B23K 37/0533 |
| | | | | 228/212 |

* cited by examiner

*Primary Examiner* — Joseph J Hail
*Assistant Examiner* — Shantese L McDonald
(74) *Attorney, Agent, or Firm* — Gulf Coast Intellectual Property Group

(57) ABSTRACT

A welding jig assembly operable to assist a welder in welding pipe elbows of varying diameters to an adjacent portion of pipe. The welding jig assembly includes a body member that is planar in manner having a first end and a second end. The body member further includes a first arm member and a second arm member that are integrally formed therewith and have a void therebetween. The first arm member and the second arm member have chuck engagement rods extending outward therefrom. The welding jig assembly includes a first set of pipe elbow support members and a second set of pipe elbow support members located on opposing lateral edges of the body member. The sets of pipe elbow support members are arcuate in form and have portions extending outward from opposing sides of the body member. An aperture is formed in the body member to receive a securing chain.

20 Claims, 3 Drawing Sheets

WELDING JIG ASSEMBLY

FIELD OF THE INVENTION

The present invention relates generally to fabrication devices, more specifically but not by way of limitation, a welding jig assembly that is configured to facilitate the welding of pipe elbows to adjacent sections of pipe wherein the present invention is configured to be rotatably movable so as to facilitate access to the entire circumferential surface of the pipes requiring welding.

BACKGROUND

Welding is well known in the art. Numerous applications from industrial to mechanical utilize welding to secure two pieces of metal to one another. There are several welding techniques but all welding involves the operable coupling of two metal objects, by way of example but not by limitation metal pipe. Metal pipe is utilized in various application ranging from plumbing to larger industrial applications such as but not limited to oilfield pipeline. Metal pipe is typically provides in sections and must be welded together most often at the construction site or place of installation of the metal pipe. Welding metal pipe must be executed properly as the pipe is often utilized at higher pressures and as such the welds must withstand the pressure being subjected to the metal pipe. During welding of a metal pipe portion to another metal pipe portion, the welder must be able to access the entire circumferential surface of the two adjacent pipe portions in order to weld the pipe portions properly.

One issue with welding metal pipe, in particular pipe elbows, in the field is the manipulation of the pipe portions in order to have access for proper welding thereof. When attempting to weld a pipe elbow to a straight pipe portion, it is cumbersome to manage the positioning of the pipe due to the angular orientation of the pipe portions. As one portion is an ninety degree elbow and the other is straight, a typical work bench does not provide optimum access to the entire circumference of the pipe and as such it is a challenge to weld pipe elbows to straight pipe in the field.

Accordingly, there is a need for a welding jig assembly that is configured to provide a welding jig to assist in the proper positioning of a elbow joint with a straight pipe and further provide rotation thereof in order to facilitate access to the entire circumferential surface so as to improve access and welding thereof.

SUMMARY OF THE INVENTION

It is the object of the present invention to provide a welding jig assembly that is configured to assist in the welding of a pipe elbow to another portion of pipe wherein the present invention includes a body member that is planar in manner and is modified triangular in shape.

Another object of the present invention is to provide a welding jig assembly configured to eliminate underhand welding of a pipe elbow and pipe portion wherein the body member includes two arm members formed at the rear end of the body member.

A further object of the present invention is to provide a welding jig assembly that is configured to assist in the welding of a pipe elbow to another portion of pipe wherein the arm members are angular in orientation with respect to each other.

Still another object of the present invention is to provide a welding jig assembly configured to eliminate underhand welding of a pipe elbow and pipe portion wherein the body member includes a first lateral edge having a first set of arcuate pipe elbow support members.

An additional object of the present invention is to provide a welding jig assembly that is configured to assist in the welding of a pipe elbow to another portion of pipe wherein the body member further includes a second lateral edge wherein the second lateral edge includes a second set of arcuate pipe elbow support members.

Yet a further object of the present invention is to provide a welding jig assembly configured to eliminate underhand welding of a pipe elbow and pipe portion wherein the arm members further include chuck engagement rods integrally formed therewith and extending outward therefrom.

Another object of the present invention is to a provide a welding jig assembly that is configured to assist in the welding of a pipe elbow to another portion of pipe wherein the body member further includes a recess on the second lateral edge.

An alternate object of the present invention is to provide a welding jig assembly configured to eliminate underhand welding of a pipe elbow and pipe portion and further including an aperture wherein the aperture is journaled through the body member proximate the first set of pipe elbow support members.

An additional object of the present invention is to provide a welding jig assembly that is configured to assist in the welding of a pipe elbow to another portion of pipe wherein the present invention includes an alternative embodiment of a chuck engagement member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
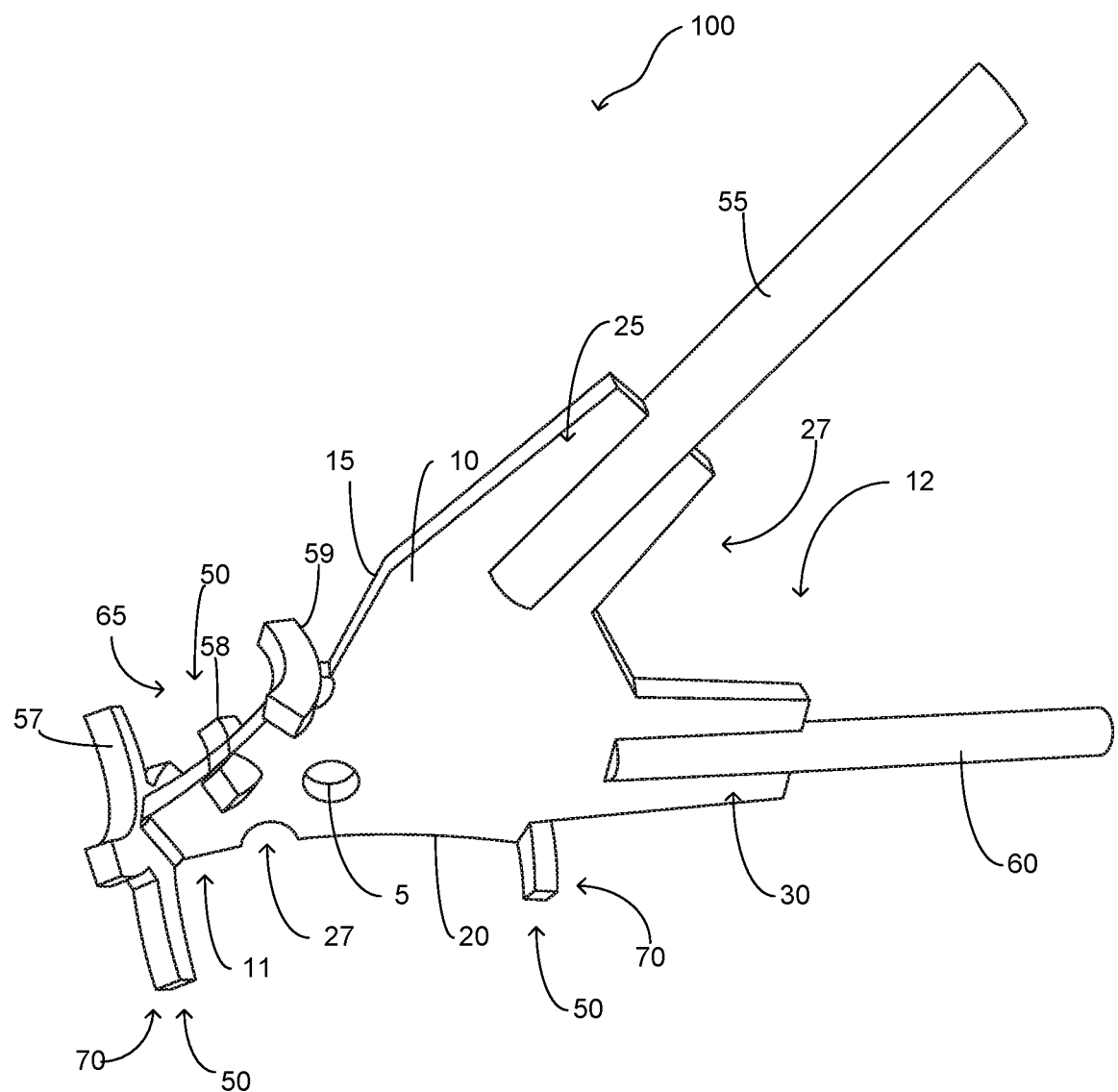
FIG. 1 is perspective view of a preferred embodiment of the present invention.

Referring now to the drawings submitted herewith, wherein various elements depicted therein are not necessarily drawn to scale and wherein through the views and figures like elements are referenced with identical reference numerals, there is illustrated a welding jig assembly 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to the Figures submitted herewith, the welding jig assembly 100 includes a body member 10. The body member 10 is manufactured from a durable rigid material such as but not limited to metal. The body member 10 is formed in a modified triangular type shape and includes a first end 11 and second end 12. The body member 10 is planar in manner and includes a first lateral edge 15 and second lateral edge 20. While no particular thickness is required for the body member 10 good results have been achieved utilizing a body member 10 that is approximately one half inch in thickness and being manufactured from a metal plate.

The body member 10 has formed as a part thereof a first arm member 25 and a second arm member 30. The first arm member 25 and second arm member 30 are formed in an angular orientation with respect to each other and have void 27 therebetween. As shown in particular herein in FIG. 2, the angular orientation of the first arm member 25 and second arm member 30 provide the proper position of the exemplary pipe elbow 99 providing a desired positioning for welding thereof ensuing the welding jig assembly 100 being operably coupled to a rotational chuck assembly 98. As will be discussed further herein, the body member 10 includes the first arm member 25 and the second arm member 30 so as to provide two sets of pipe elbow support members 50.

Operably coupled to the first arm member 25 is a first chuck engagement rod 55. The first chuck engagement rod 55 is a metal rod having a diameter of approximately one inch. The first chuck engagement rod 55 is secured to the first arm member 25 utilizing suitable durable techniques such as but not limited to welding. The first chuck engagement rod 55 extends outward from the first arm member 25 a sufficient distance so as to be operably coupled with the exemplary rotational chuck assembly 98 and provide clearance for the body member 10 during use of the welding jig assembly 100. The welding jig assembly 100 further includes a second chuck engagement rod 60 that is formed similarly to the first chuck engagement rod 60. The second chuck engagement rod 60 is provided so as to allow the welding jig assembly 100 to be operated in an inverse orientation providing access to alternate pipe elbow support members 50.

The body member 10 includes aperture 5 journaled therethrough. The aperture 5 is annular in shape and is provided for a securing chain 93 to be passed therethrough so as to provide securing of the pipe elbow 99 to the welding jig assembly 100. It is contemplated within the scope of the present invention that the aperture 5 could be formed in alternate sizes and shapes. The second lateral edge 20 includes recess 27 formed therein proximate first end 11 of the body member 10. The recess 27 provides clearance for the head of a vice grip or similar tool that is being utilized to provide tension on the securing chain 93. The recess 27 is semicircular in shape but it is contemplated within the scope of the present invention that the recess 27 could be formed in alternate shapes and have a depth suitable to accommodate a desired tool.

The welding jig assembly 100 includes a first set of pipe elbow support members 65 and a second set of pipe elbow support members 70. The first set of pipe elbow supports 65 are secured to the first lateral edge 15 utilizing suitable durable techniques such as but not limited to welding. The first set of pipe elbow supports 65 are arcuate in shape having portions extending outward from opposing sides of the body member 10. The arcuate form of the first set of pipe elbow support members 65 vary slightly so as to accommodate alternate diameters of pipes. In the preferred embodiment of the present invention, the first set of pipe support member 65 have an arcuate radius range therein configured to accommodate pipe diameters ranging from two to four inches. While the aforementioned is a preferred form of the first set of pipe elbow support members 65, it is contemplated within the scope of the present invention that the first set of pipe elbow support members 65 could be formed with alternate radius in order to accommodate alternate diameters of pipe elbows.

The second lateral edge 20 has secured thereto the second set of pipe elbow support members 70. The second set of pipe elbow support members 70 are formed similarly to the first set of pipe support members 65 wherein the second set of pipe support members 65 are arcuate in form having portions extending outward from opposing sides of the body member 10. The second set of pipe elbow support members 70 are sized to accommodate larger diameters of pipe such as but not limited to six and eight inch pipe. While the preferred embodiment of the present invention includes a first set of pipe elbow support members 65 that include three pipe elbow supports 57,58,59 it is contemplated within the scope of the present invention that the first set of pipe elbow support members 65 could have as few as one pipe elbow support or more than three pipe elbow support members. Additionally, the second set of pipe elbow support members 70 could have one pipe elbow support member or more than two pipe elbow support member.

Figure 3:
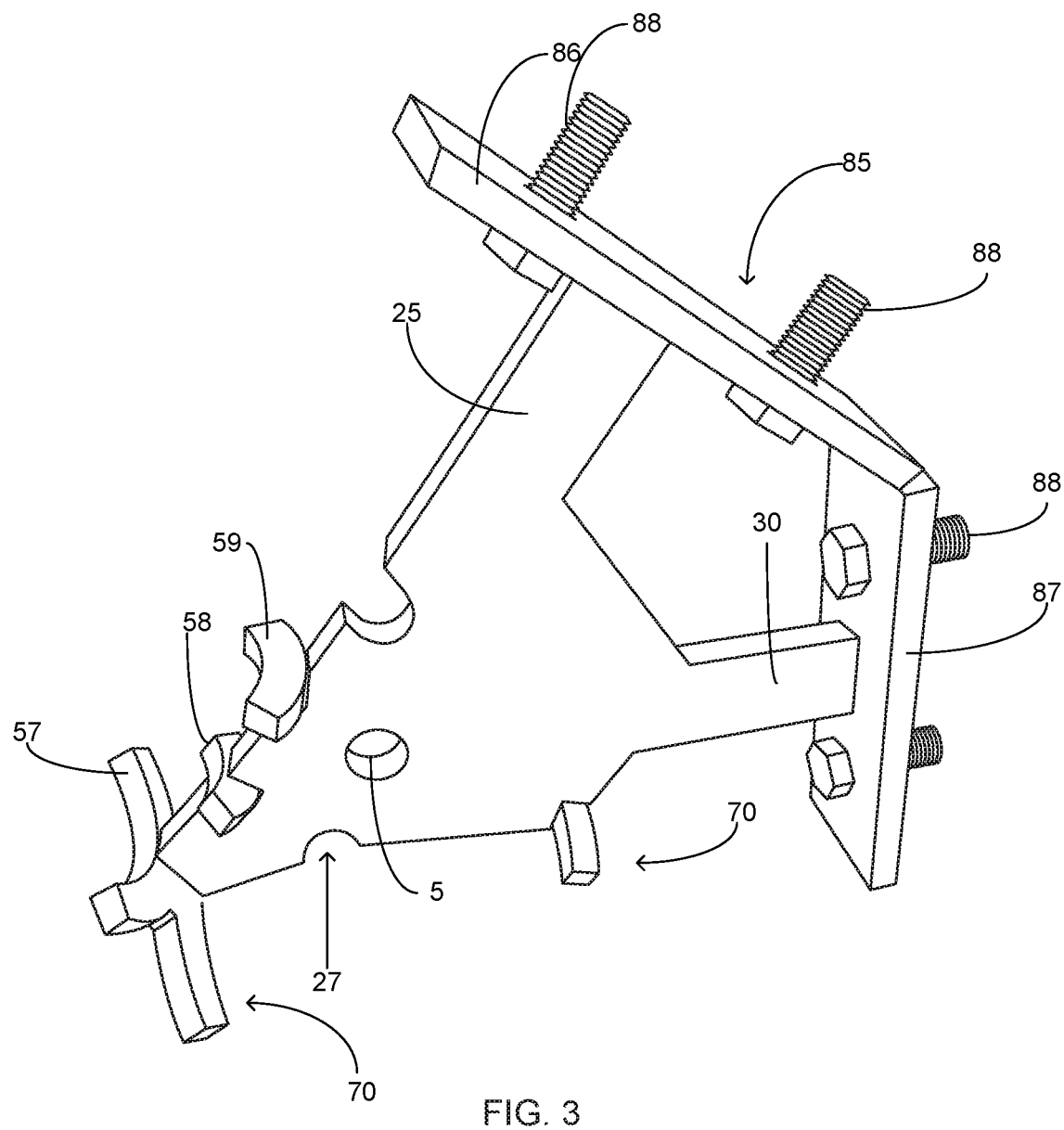
FIG. 3 is a perspective view of the present invention with an alternative embodiment of the chuck engagement assembly.

Now referring in particular to FIG. 3 submitted herewith, the welding jig assembly 100 is illustrated therein with an alternate chuck engagement assembly 85. The alternate chuck engagement assembly 85 provides the necessary structure to secure the welding jig assembly 100 to a rotational wheel as opposed to an exemplary rotational chuck 98. The alternate chuck assembly 85 includes a first mounting plate 86 and a second mounting plate 87 that are secured to the first arm member 25 and second arm member 30 respectively. The first mounting plate 86 and second mounting plate 87 provide a desirable structure to be placed adjacent to a surface of rotational wheel and secured thereto. The first mounting plate 86 and second mounting plate 87 are secured to a wheel (not illustrated herein) utilizing fasteners 88.

Figure 2:
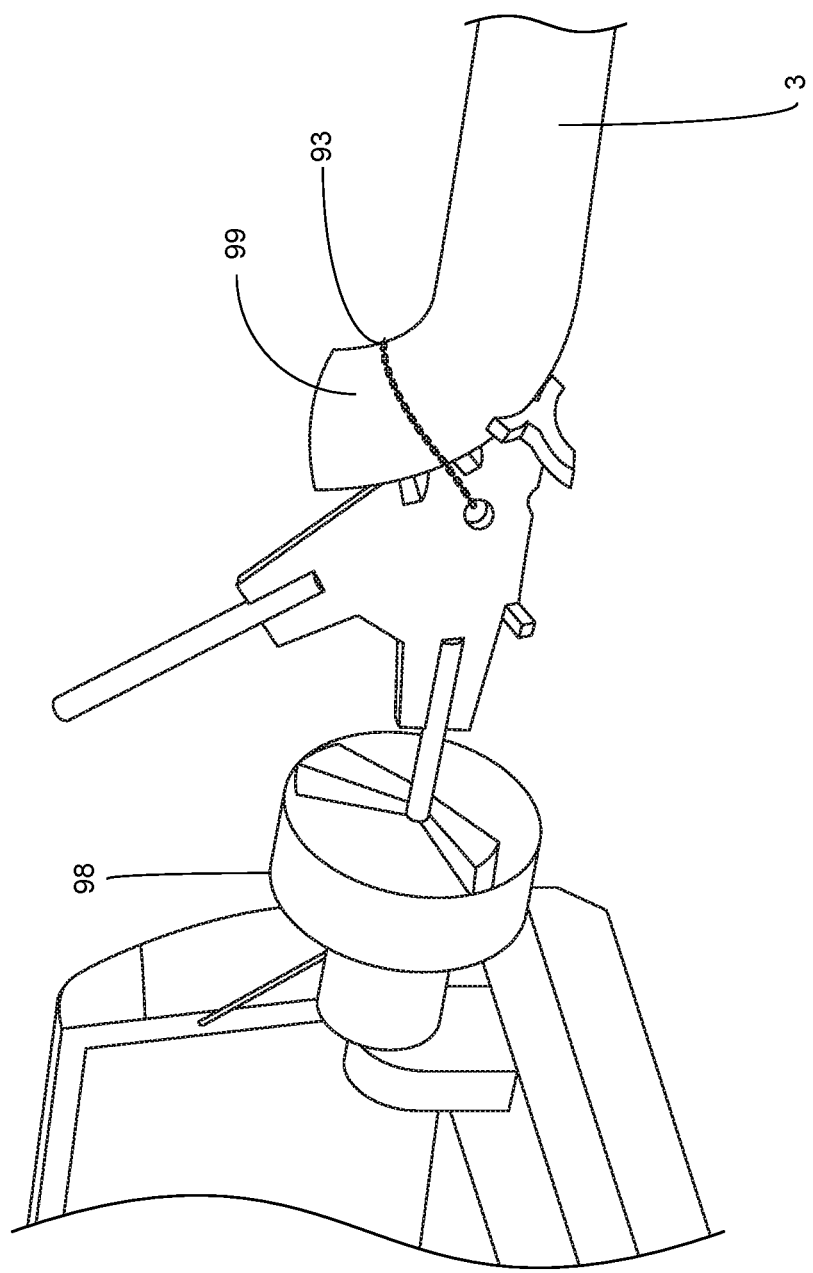
FIG. 2 is a perspective view of the preferred embodiment of the present invention operably coupled to a rotational chuck.

In use the advantage of the welding jig assembly 100 is best illustrated in FIG. 2 submitted as a part hereof. Ensuing an exemplary pipe being secured to the welding jig assembly 100, the rotational chuck assembly 98, the welding jig assembly 100 along with the pipe elbow 99 can be rotatably moved to facilitate the ability for a welder to maintain a desirable position and eliminate the need for a welder to have to utilize alternate techniques such as but not limited to underhand welding to properly weld the pipe elbow 99 to pipe portion 3.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A welding jig assembly comprising:
   a body member, said body member having a first end and a second end, said body member being planar in manner, said body member having a first lateral edge and a second lateral edge, said body member having a first arm member and a second arm member, said first arm member and said second arm member being integrally formed into said second end of said body member, said first arm member and said second arm member being angular in orientation with respect to each other;
   a first pipe elbow support set, said first pipe elbow support set having at least one pipe elbow support member, said first pipe elbow support set being located on said first lateral edge of said body member, said at least one pipe elbow support member configured to mateably engage a pipe elbow;
   a second pipe elbow support set, said second pipe elbow support set having at least one pipe elbow support member, said second pipe elbow support set being located on said second lateral edge of said body member, said at least one pipe elbow support member of said second pipe elbow support set configured to mateably engage a pipe elbow; and
   wherein the welding jig assembly is configured to be secured to a rotationally moving apparatus so as to provide complete circumferential access to a pipe elbow secured to the welding jig apparatus.

2. The welding jig assembly as recited in claim 1, wherein the at least one pipe elbow support member of the first pipe elbow support set includes a pipe support member, said pipe support member being arcuate in shape and including portions extending outward from opposing sides of the body member.

3. The welding jig assembly as recited in claim 2, wherein said body member further includes an aperture, said aperture configured to have a securing chain journaled therethrough.

4. The welding jig assembly as recited in claim 3, wherein said first arm member further includes a first chuck engagement rod, said first chuck engagement rod extending outward from said first arm member, said first chuck engagement rod operable to be inserted into a rotational chuck assembly.

5. The welding jig assembly as recited in claim 4, wherein the at least one pipe elbow support member of the second pipe elbow support set includes a pipe support member, said pipe support member of said second pipe elbow support set is arcuate in shape and includes portions extending outward from opposing sides of the body member.

6. The welding jig assembly as recited in claim 5, wherein said second arm member further includes a second chuck engagement rod, said second chuck engagement rod extending outward from said second arm member, said second chuck engagement rod operable to be inserted into a rotational chuck assembly.

7. The welding jig assembly as recited in claim 6, wherein the welding jig assembly is configured to accommodate pipe elbows having a diameter between two and eight inches.

8. A welding jig assembly configured to provide circumferential access to a pipe elbow during the welding process wherein the welding jig assembly comprises:
   a body member, said body member having a first end and a second end, said body member being planar in manner, said body member having a first lateral edge and a second lateral edge, said body member having a first arm member and a second arm member, said first arm member and said second arm member having a void therebetween, said first arm member and said second arm member being integrally formed into said second end of said body member, said first arm member and said second arm member being angular in orientation with respect to each other;
   a first pipe elbow support set, said first pipe elbow support set having a plurality of pipe elbow support members, said first pipe elbow support set being located on said first lateral edge of said body member, said plurality of pipe elbow support members configured to mateably engage pipe elbows of varying diameters;
   a second pipe elbow support set, said second pipe elbow support set having a plurality of pipe elbow support members, said second pipe elbow support set being located on said second lateral edge of said body member, said plurality of pipe elbow support members of said second pipe elbow support set configured to mateably engage a pipe elbow of alternate diameters; and
   wherein the welding jig assembly is configured to be secured to a rotationally moving apparatus so as to provide rotational movement of the welding jig assembly and ensure complete circumferential access to a pipe elbow secured to the welding jig apparatus.

9. The welding jig assembly as recited in claim 8, and further including a first rotational mounting assembly, wherein the first rotational mounting assembly is selected from one of the following: a chuck engagement rod or a mounting plate.

10. The welding jig assembly as recited in claim 9, wherein said body member further includes an aperture, said aperture configured to have a securing chain journaled therethrough.

11. The welding jig assembly as recited in claim 10, and further including a second rotational mounting assembly, wherein the second rotational mounting assembly is selected from one of the following: a chuck engagement rod or a mounting plate.

12. The welding jig assembly as recited in claim 11, wherein the plurality of pipe elbow support members of said second pipe elbow support set is arcuate in shape having portions extending outward from opposing sides of said body member.

13. The welding jig assembly as recited in claim 12, wherein the welding jig assembly is configured to accommodate pipe elbows having a diameter between two and eight inches.

14. The welding jig assembly as recited in claim 13, wherein the plurality of pipe elbow support members of said first pipe elbow support set is arcuate in shape having portions extending outward from opposing sides of said body member.

15. A welding jig assembly configured to provide circumferential access to a pipe elbow during the welding process wherein the welding jig assembly comprises:
  a body member, said body member having a first end and a second end, said body member being planar in manner having opposing side, said body member further including an aperture proximate said first end thereof, said aperture configured to have a securing chain journaled therethrough, said body member having a first lateral edge and a second lateral edge, said body member having a first arm member and a second arm member, said first arm member and said second arm member having a void therebetween, said first arm member and said second arm member being integrally formed into said second end of said body member, said first arm member and said second arm member being angular in orientation with respect to each other;
  a first pipe elbow support set, said first pipe elbow support set having three pipe elbow support members, said first pipe elbow support set being located on said first lateral edge of said body member, said three pipe elbow support members configured to mateably engage pipe elbows ranging from two to four inches in diameter;
  a second pipe elbow support set, said second pipe elbow support set having two pipe elbow support members, said second pipe elbow support set being located on said second lateral edge of said body member, said two pipe elbow support members of said second pipe elbow support set configured to mateably engage a pipe elbow of six and eight inches in diameter; and
  wherein the welding jig assembly is configured to be secured to a rotationally moving apparatus so as to provide rotational movement of the welding jig assembly and ensure complete circumferential access to a pipe elbow secured to the welding jig apparatus.

16. The welding jig assembly as recited in claim 15, wherein said second lateral edge further includes a recess formed therein, said recess being semicircular in form, said recess operable to provide clearance for a gripping device coupled to the securing chain.

17. The welding jig assembly as recited in claim 16, wherein said first arm member further includes a first chuck engagement rod, said first chuck engagement rod extending outward from said first arm member, said first chuck engagement rod operable to be inserted into a rotational chuck assembly.

18. The welding jig assembly as recited in claim 17, wherein said second arm member further includes a second chuck engagement rod, said second chuck engagement rod extending outward from said second arm member, said second chuck engagement rod operable to be inserted into a rotational chuck assembly.

19. The welding jig assembly as recited in claim 18, wherein the two pipe elbow support members of said second pipe elbow support set are arcuate in shape having portions extending outward from opposing sides of said body member.

20. The welding jig assembly as recited in claim 19, wherein the three pipe elbow support members of the first pipe elbow support set are arcuate in shape and include portions extending outward from opposing sides of the body member.

* * * * *